US010325164B2

(12) United States Patent
Terada

(10) Patent No.: US 10,325,164 B2
(45) Date of Patent: Jun. 18, 2019

(54) THREE DIMENSIONAL OBJECT RECOGNITION DEVICE

(71) Applicant: DENSO CORPORATION, Kariya, Aichi-pref. (JP)

(72) Inventor: Toshihiko Terada, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 29 days.

(21) Appl. No.: 15/807,111

(22) Filed: Nov. 8, 2017

(65) Prior Publication Data

US 2018/0137378 A1 May 17, 2018

(30) Foreign Application Priority Data

Nov. 11, 2016 (JP) .................. 2016-220710

(51) Int. Cl.
G06K 9/00 (2006.01)
G06K 9/03 (2006.01)
G06K 9/20 (2006.01)
G06K 9/78 (2006.01)
H04N 13/239 (2018.01)
G05D 1/02 (2006.01)
G06F 3/00 (2006.01)
B60W 30/09 (2012.01)

(52) U.S. Cl.
CPC ....... G06K 9/00805 (2013.01); G05D 1/0246 (2013.01); G06K 9/00201 (2013.01); G06K 9/03 (2013.01); G06K 9/209 (2013.01); G06K 9/78 (2013.01); H04N 13/239 (2018.05); B60W 30/09 (2013.01); B60W 2420/42 (2013.01); B60W 2550/10 (2013.01); G05D 1/0251 (2013.01); G05D 2201/0213 (2013.01)

(58) Field of Classification Search
CPC ............ G06K 9/00; G06T 7/00; B60W 30/00
USPC .......................................... 382/103; 348/169
See application file for complete search history.

(56) References Cited

U.S. PATENT DOCUMENTS 9,185,387 B2 * 11/2015 Campbell .............. G06T 5/002
2012/0243776 A1    9/2012 Arafune
2012/0288191 A1 * 11/2012 Kido ................... G06K 9/4652
                                                              382/165

FOREIGN PATENT DOCUMENTS

JP    2003-058880 A    2/2003
JP    2011-053737 A    3/2011
JP    2012-199736 A    10/2012
JP        5272042 B2    8/2013
JP    2016-024160 A    2/2016

* cited by examiner

Primary Examiner — Abolfazl Tabatabai
(74) Attorney, Agent, or Firm — Knobbe, Martens, Olson & Bear, LLP

(57) ABSTRACT

A three dimensional object recognition device has in-vehicle cameras capturing front images of a vehicle, a recognition section and a light shaft judgment section. The recognition section detects a three dimensional object in the front images based on a parallax generated between the front images. The light shaft judgment section detects whether a light shaft phenomenon has happened in a three dimensional object area in at least one of the front images, and judges that the detected three dimensional object is an incorrect three dimensional object caused due to the light shaft phenomenon when detecting the light shaft phenomenon at every time when the recognition section detects the three dimensional object.

4 Claims, 3 Drawing Sheets

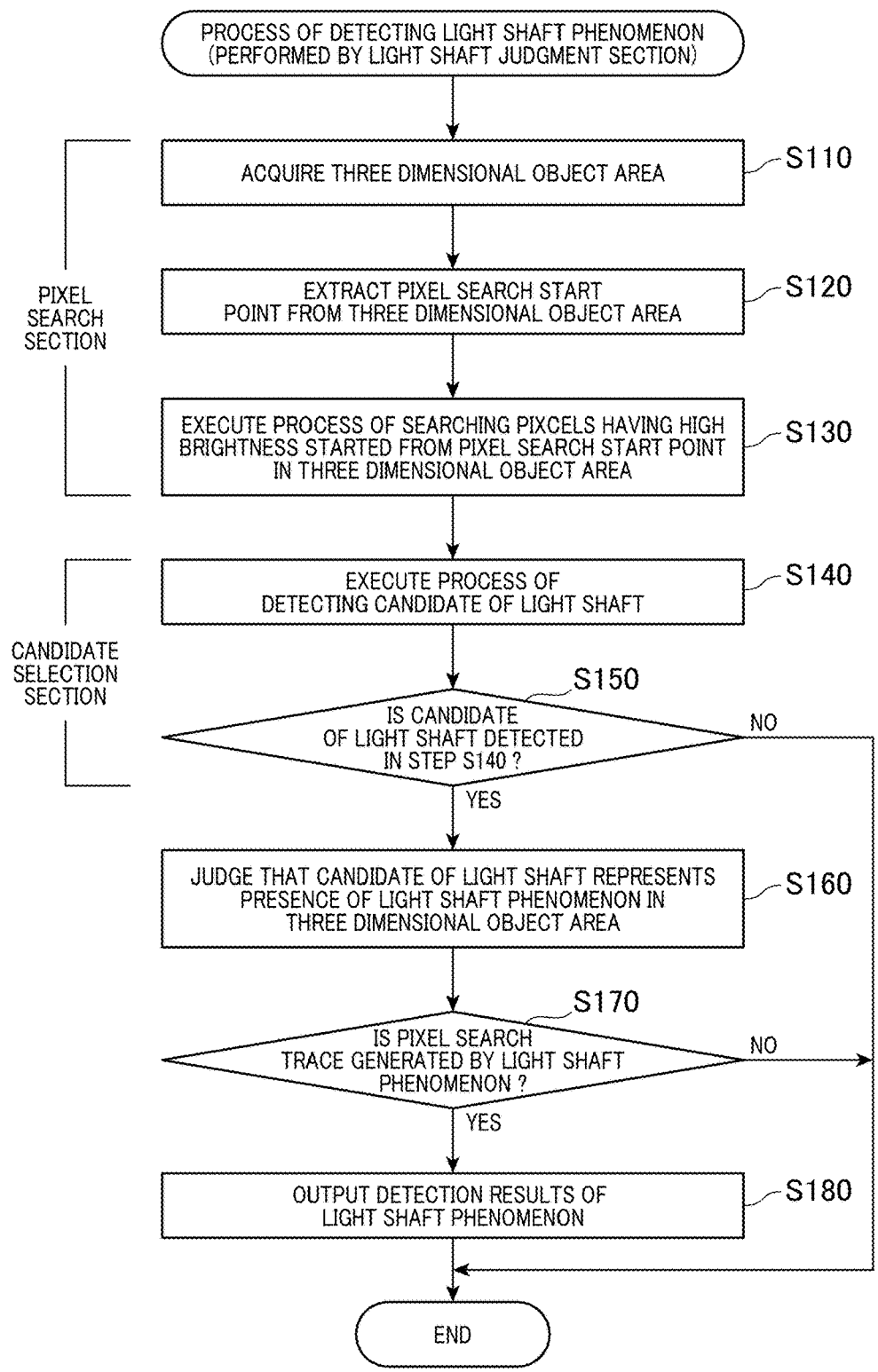

THREE DIMENSIONAL OBJECT RECOGNITION DEVICE

CROSS-REFERENCE TO RELATED APPLICATION

This application is related to and claims priority from Japanese Patent Application No. 2016-220710 filed on Nov. 11, 2016, the contents of which are hereby incorporated by reference.

BACKGROUND OF THE INVENTION

1. Field of the Invention

The present invention relates to three dimensional object recognition devices capable of recognizing a three dimensional object on the basis of a parallax between images obtained by a pair of cameras, for example, mounted to a vehicle.

2. Description of the Related Art

There is a conventional technique regarding three dimensional object recognition devices. For example, a patent document 1, Japanese patent laid open publication No. 2016-24160, shows a conventional three dimensional object recognition device. A vehicle has the conventional three dimensional object recognition device, and in-vehicle cameras such as a left hand side camera and a right hand side camera.

The left hand side camera and the right hand side camera acquire front images of a forward view in front of the vehicle, and transmits the acquired front images to the conventional three dimensional object recognition device. When receiving the front images, the conventional three dimensional object recognition device recognizes a three dimensional object in the front images on the basis of a parallax between the front images.

Such a conventional three dimensional object recognition device may recognize a three dimensional object as being larger than an actual three dimensional object. This phenomenon is generated due to refraction of light caused by water drops or traces of water drops on the in-vehicle cameras. So as to avoid such phenomenon, a patent document 2, Japanese patent No. 5272042, has proposed a device capable of specifying a part, in which light is refracted, on the basis of brightness and color of each pixel, and of determining an outline of the three dimensional object.

By the way, in the conventional three dimensional object recognition device previously described a light shaft phenomenon (or phenomenon of shaft of light) often happens. When such a light shaft phenomenon occurs by fine cylindrical glasses caused by stains, etc. on a front windshield glass of the vehicle, light is refracted, and the light extends from a light source in straight lines on the front images captured by the left hand side camera and the right hand side camera.

When such a light shaft phenomenon is generated in the front images captured by and transmitted from the left hand side camera and the right hand side camera, and the two front images are approximately matched, the conventional three dimensional object recognition device recognizes an incorrect three dimensional object due to the parallax between the front images, composed of the left hand side image and the right hand side image, caused by the light shaft phenomenon.

As previously described, the conventional three dimensional object recognition device disclosed in the patent document 2 can prevent expansion of the outer edge of a three dimensional object due to the diffusion of light. However, it is difficult for the conventional three dimensional object recognition device to detect the occurrence of incorrect recognition of the three dimensional object caused by a light shaft phenomenon.

SUMMARY

It is therefore desired to provide a three dimensional object recognition device capable of detecting a three dimensional object on the basis of a parallax between acquired two front images, and of detecting occurrence of incorrect recognition of a three dimensional object caused by a light shaft phenomenon.

An exemplary embodiment provides a three dimensional object recognition device. The three dimensional object recognition device has a computer system and a pair of a left hand side camera and a right hand side camera. The left hand side camera and the right hand side camera capture front images of a same forward view of an own vehicle on which the three dimensional object recognition device is mounted. The computer system includes a central processing unit configured to provide a recognition section and a light shaft judgment section. The recognition section receives front images transmitted from the left hand side camera and the right hand side camera, and detects and recognizes a three dimensional object in the front images on the basis of a parallax generated between the images. The light shaft judgment section detects whether a light shaft phenomenon has happened in a three dimensional object area in at least one of the front images every time the recognition section recognizes a three dimensional object. The light shaft judgment section judges that the three dimensional object recognized by the recognition section is an incorrect three dimensional object when detecting the generation of the light shaft phenomenon.

According to the three dimensional object recognition device previously described, the recognition section recognizes a three dimensional object in the front images, transmitted from the pair of the left hand side camera and the right hand side camera, on the basis of a parallax between the front images. The light shaft judgment section detects whether the recognition section performs an incorrect recognition of the three dimensional object every time the recognition section recognizes the three dimensional object. When the recognition section performs the incorrect recognition of the three dimensional object due to the light shaft phenomenon, the light shaft judgment section detects the occurrence of the incorrect recognition of the recognition section, and transmits an instruction signal to the recognition section. When receiving the instruction signal, the recognition section prohibits the transmission of an control signal to a is vehicle control device mounted on the vehicle so as to prohibit execution of collision avoidance operation by using a brake device and/or a steering device of the vehicle because the three dimensional object recognized by the recognition section is generated due to the light shaft phenomenon, i.e. is not an actual three dimension object.

According to the three dimensional object recognition device previously described, and which will be explained in detail later, it is possible to suppress the transmission of an incorrect instruction regarding avoiding operation to the vehicle control device when the recognition section detects the presence of a three dimensional object due to the light shaft phenomenon. This makes it possible to enhance the control reliability of the three dimensional object recognition device.

BRIEF DESCRIPTION OF THE DRAWINGS

A preferred, non-limiting embodiment of the present invention will be described by way of example with reference to the accompanying drawings, in which:

FIG. 3 is a flow chart showing a process of detecting a light shaft phenomenon performed by the control device of the three dimensional object recognition device according to the exemplary embodiment of the present invention;

DETAILED DESCRIPTION OF THE PREFERRED EMBODIMENTS

Figure 1:
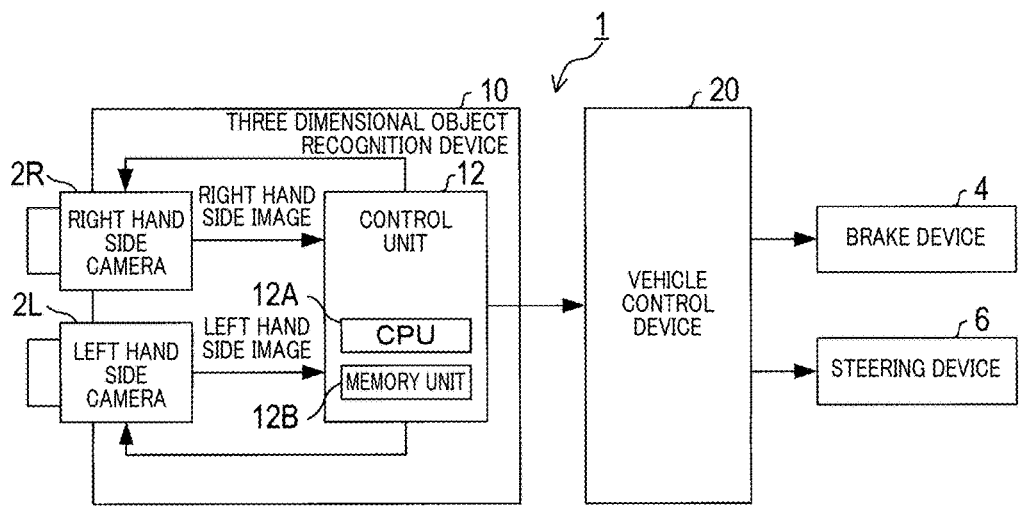
FIG. 1 is a block diagram showing an overall structure of a collision avoidance assistance system having a three dimensional object recognition device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a three dimensional object recognition device according to an exemplary embodiment with reference to FIG. 1, FIG. 2, FIG. 3 and FIG. 4A to FIG. 4C.

FIG. 1 is a block diagram showing an overall structure of a collision avoidance assistance system 1 having a three dimensional object recognition device 10 according to the exemplary embodiment.

As shown in FIG. 1, the collision avoidance assistance system 1 having the three dimensional object recognition device 10 according to the exemplary embodiment receives front images of a forward view of an own vehicle captured by and transmitted from the left hand side camera 2L and the right hand side camera 2R, and recognizes the presence of a three dimensional object in front of the own vehicle on the basis of a parallax between the received front images, and of avoiding a collision of the own vehicle with the three dimensional object.

The collision avoidance assistance system 1 has the three dimensional object recognition device 10 and a vehicle control device 20. The three dimensional object recognition device 10 has the left hand side camera 2L, the right hand side camera 2R, and the control unit 12. The vehicle control device 20 has a brake device 4 and a steering device 6.

The vehicle control device 20 drives the brake device 4 and the steering device 6 on the basis of the recognition results of a three dimensional object by the three dimensional object recognition device 10 according to the exemplary embodiment.

The pair of the left hand side camera 2L and the right hand side camera 2R form a stereo camera assembly so as to capture front images of a forward view in front of the own vehicle from a left hand side and a right hand side of the own vehicle. Each of the left hand side camera 2L and the right hand side camera 2R transmits data signals regarding the captured images to the control unit 12.

The control unit 12 is composed of a microcomputer which has a central processing unit (CPU) 12A, a semiconductor memory unit 12B, an input output ports (not shown), etc. The semiconductor memory unit 12B has a read only memory (ROM), a random access memory (RAM), a flash memory, etc.

The CPU 12A executes programs stored in the memory unit 12B to perform various processes and to recognize a three dimensional object in front of the own vehicle. The CPU 12A transmits the recognition results to the vehicle control device 20.

Similar to the control unit 12, the vehicle control device 20 is composed of a microcomputer which has a central processing unit (CPU), a memory unit, etc. The vehicle control device 20 drives the brake device 4 on the basis of the recognition results of the three dimensional object transmitted from the control unit 12. This control operation correctly avoids a collision of the own vehicle with the three dimensional object. For example, the recognition results of a three dimensional object provides information regarding a position and a size of a three dimensional object observed from the own vehicle.

When it is difficult to stop the own vehicle from moving in front of the three dimensional object, the vehicle control device 20 drives the steering device 6 so as to avoid a collision of the own vehicle with the three dimensional object. This control operation makes it possible to provide safety driving to the driver of the own vehicle.

Figure 2:
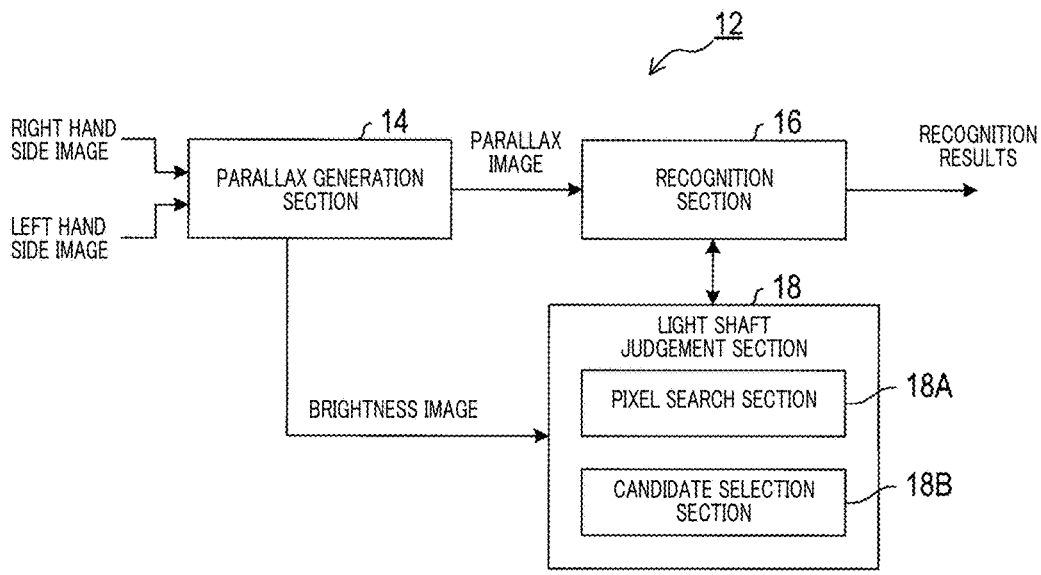
FIG. 2 is a block diagram showing a functional structure of a control device of the three dimensional object recognition device according to the exemplary embodiment of the present invention.

FIG. 2 is a block diagram showing a functional structure of the control unit 12 in the three dimensional object recognition device 10 according to the exemplary embodiment. The control unit 12 in the three dimensional object recognition device 10 executes the programs stored in the memory unit 12B so as to realize the functions of a parallax generation section 14, the function of a recognition section 16 and the function of a light shaft judgment section 18 shown in FIG. 2.

The parallax generation section 14 in the control unit 12 receives image data regarding the front images composed of a left hand side image and a right hand side image transmitted from the left hand side camera and the right hand side camera, respectively.

The parallax generation section 14 generates a parallax image which represents a parallax between the left hand side image and the right hand side image on the basis of the received image data.

Next, the recognition section 16 recognizes a three dimensional object in the received image data on the basis of the parallax image generated by the parallax generation section 14, and generates three dimensional object information which represents a position and a size of each of the detected three dimensional objects. The recognition section 16 transmits the generated three dimensional object information to the vehicle control device 20.

The patent document 1 and the patent document 2 show the technique which recognizes a three dimensional object in front images on the basis of parallax between the front images. This technique also uses the function of the parallax generation section 14 and the function of the recognition section 16 in the control unit 12. Accordingly, the detailed explanation of the technique of recognizing a three dimensional object on the basis of parallax images is omitted here for brevity.

The light shaft judgment section 18 in the control unit 12 shown in FIG. 2 executes a judgement process which detects whether the recognition section 16 causes an incorrect recognition of a three dimensional object due to a light shaft phenomenon caused by the left hand side camera 2L and the right hand side camera 2R of the own vehicle.

When determining that the three dimensional object recognized by the recognition section 16 is an incorrect three dimensional object due to the light shaft phenomenon, the light shaft judgment section 18 transmits information regarding the incorrect recognition of the three dimensional object to the recognition section 16.

When receiving the information regarding the incorrect recognition of the three dimensional object transmitted from the light shaft judgment section 18, the recognition section 16 prohibits the transmission of the recognition results to the vehicle control device 20 so as to prohibit execution of collision avoidance operation by using the brake device 4 and/or the steering device 6 of the own vehicle.

In the structure of the collision avoidance assistance system 1 having the three dimensional object recognition device 10 according to the exemplary embodiment previously described, the vehicle control device 20 correctly prevents the execution of the brake control and/or the execution of the steering control so as to stop executing the collision avoidance operation of the own vehicle with an incorrect three dimensional object generated due to the light shaft phenomenon.

FIG. 3 is a flow chart showing the process of detecting a light shaft phenomenon performed by the control unit 12 in the three dimensional object recognition device 10 according to the exemplary embodiment.

The function of the light shaft judgment section 18 is realized every time the CPU 12A executes the process of detecting a light shaft phenomenon shown in FIG. 3. The light shaft judgment section 18 has a pixel search section 18A and a candidate selection section 18B shown in FIG. 2. That is, the pixel search section 18A and the candidate selection section 18B in the light shaft judgment section 18 are realized every time the CPU 12A executes the process of detecting a light shaft phenomenon shown in FIG. 3.

The control unit 12 shown in FIG. 3 executes the process of detecting a light shaft phenomenon every time the recognition section 16 detects and recognizes the presence of a three dimensional object in the image data regarding the left hand side image and/or the right hand side image.

The process of detecting a light shaft phenomenon shown in FIG. 3, i.e. the light shaft judgment section 18 judges occurrence of a light shaft phenomenon in one of the left hand side image and the right hand side image when recognition section 16 recognizes a three dimensional object.

Figure 4A:
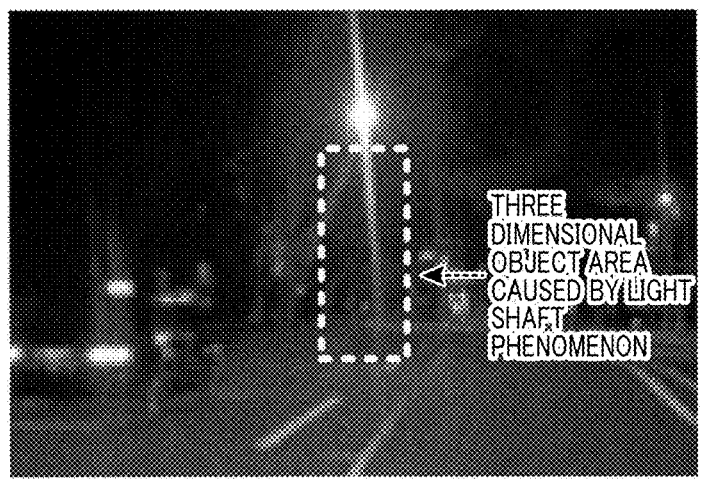
FIG. 4A is a view showing an area of a three dimensional object in a captured image transmitted from in-vehicle cameras mounted on an own vehicle equipped with the collision avoidance assistance system having the three dimensional object recognition device according to the exemplary embodiment of the present invention.

In step S110 shown in FIG. 3, every time the recognition section 16 recognizes a three dimensional object, the CPU 12A in the control unit 12 acquires an image area of the three dimensional object, as a three dimensional object area, for example shown in FIG. 4A, in one of the front images. The operation flow progresses to step S120.

Figure 4B:
FIG. 4B is a view showing a pixel search start point in the captured image transmitted from the in-vehicle cameras.

FIG. 4A is a view showing the three dimensional object area in the image data transmitted from the left hand side camera and the right hand side camera mounted on the own vehicle. FIG. 4B is a view showing the pixel search start point in the image data.

In step S120, as shown in FIG. 4B, the CPU 12A extracts a pixel search start point having a brightness which is not less than a constant value in the three dimensional object area obtained in step S110. The extracted pixel search start point is used as the start point for detecting occurrence of the light shaft phenomenon in the three dimensional object area. The operation flow progresses to step S130.

Figure 4C:
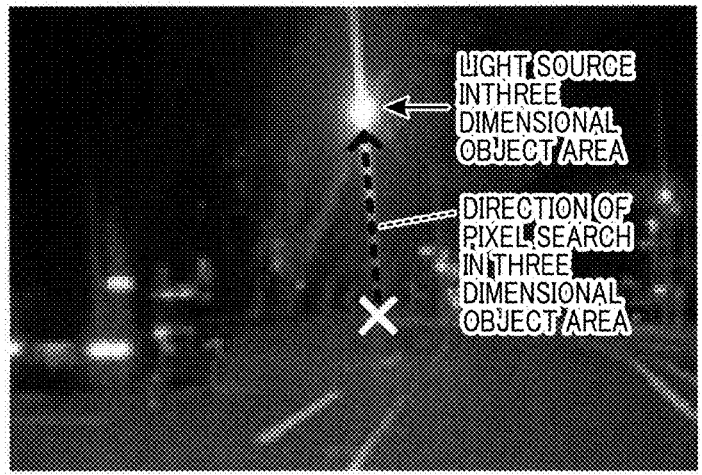
FIG. 4C is a view showing a pixel searching process from the pixel search start point shown in FIG. 4B.

FIG. 4C is a view showing a pixel search process which is started from the pixel search start point shown in FIG. 4B.

In step S130, for example, as shown in FIG. 4C, the CPU 12A executes a pixel search process so as to search pixels having a high brightness of not less than the constant value. The pixel search process is started from the pixel search start point in the three dimensional object area. It is acceptable for the CPU 12A to search the pixel search start point in step S120 and to search pixels having a high brightness in the overall received image data, or in a predetermined area in the received image data. The CPU 12A generates a pixel search trace as the results of the pixel search process. The execution of the processes in step S110 to step S130 provides the function of the pixel search section 18A in the light shaft judgment section 18 shown in FIG. 2. The operation flow progresses to step S140.

In step S140, the CPU 12A executes a process of detecting whether a candidate of light shaft is generated, i.e. whether a pixel or a pixel area having a predetermined brightness which is not less than a brightness threshold value is present as a light source on the pixel search trace in the three dimensional object area. The operation flow progresses to step S150.

In step S150, the CPU 12A executes a process of determining whether the detection result of the process in step S140 indicates the presence of the candidate of light shaft in the three dimensional object area. In other word, the CPU 12A detects whether the pixel search trace generated in step S130 is a candidate of a light shaft on the basis of the detection result in step S140 which detects whether the pixel or the pixel area represents the light source on the pixel search trace.

The execution of the processes in step S140 to step S150 realizes the function of the candidate selection section 18B in the light shaft judgment section 18 shown in FIG. 2.

In step S150, when the detection result in step S140 indicates that the pixel or the pixel area having the brightness of not less than the brightness threshold value of the light source is present on the pixel search trace in the three dimensional object area, and the detection result in step S150 indicates that the pixel search trace generated in step S130 is a candidate of the light shaft, the operation flow progresses to step S160.

In step S160, the CPU 12A detects whether the candidate of light shaft correctly represents the light shaft phenomenon in the three dimensional object area.

In more detail, in step S160, the CPU 12A detects whether the pixel search trace obtained in step S130 is located on a straight line or is apart from the straight line. This straight line connects the pixel search start point with the pixel or the pixel area as the light source determined in step S140. The operation flow progresses to step S170.

In step S170, when the detection result in step S160 indicates that the pixel search trace obtained in step S130 is located on the straight line, the CPU 12A determines that the pixel search trace is generated by the light shaft phenomenon. The operation flow progresses to step S180.

In step S180, the light shaft judgment section 18 transmits the detection results in step S170 to the recognition section 16. That is, the light shaft judgment section 18 transmits the information that the recognized three dimensional object is an incorrect three dimensional object generated by the light shaft phenomenon. The CPU 12A in the control unit 12 finishes the process of detecting a light shaft phenomenon shown in FIG. 3.

When the detection result in step S150 indicates that the pixel search trace generated in step S130 is not the candidate of light shaft, or when the detection result in step S170 indicates that the pixel search trace does not indicate the light shaft phenomenon, the CPU 12A in the control unit 12 finishes the process of detecting a light shaft phenomenon shown in FIG. 3.

As previously described in detail, the three dimensional object recognition device 10 in the collision avoidance assistance system 1 according to the exemplary embodiment detects and recognizes a three dimensional object which is present in front of the own vehicle on the basis of a parallax between the left had side image and the right hand side image transmitted from the left hand side camera 2L and the right hand side camera 2R, and avoid a collision of the own vehicle with the recognized three dimensional object.

The three dimensional object recognition device 10 according to the exemplary embodiment has the control unit 12 capable of detecting and recognizing a three dimensional object in the received front images composed of the left hand side image and the right hand side image.

The control unit 12 has the light shaft judgment section 18 in addition to the recognition section 16 so as to judge whether the recognized three dimensional object is an incorrect three dimensional object caused by the incorrect recognition due to the light shaft phenomenon.

According to the structure of the three dimensional object recognition device 10, it is possible for the light shaft judgment section 18 to correctly detect occurrence of the incorrect recognition of the three dimensional object recognized by the recognition section 16 on the basis of the parallax between the images generated by the light shaft phenomenon in the left hand side image and the right hand side image transmitted from the left hand side camera 2L and the right hand side camera 2R.

In the structure of the collision avoidance assistance system 1 having the three dimensional object recognition device 10 of the exemplary embodiment, the three dimensional object recognition device 10 transmits the three dimensional object information to the vehicle control device 20 so as to prevent the execution of the vehicle control so as to avoid occurrence of collision of the own vehicle with the incorrect recognized three dimensional object. This makes it possible to enhance the operational reliability of the three dimensional object recognition device 10, i.e. the operational reliability of the collision avoidance assistance system 1.

Further, the light shaft judgment section 18 is configured to detect whether the three dimensional object recognized by the recognition device 16 is generated by the light shaft phenomenon. This structure makes it possible to detect a light shaft phenomenon in the captured image data with high efficiency, and to reduce the overall load of the control unit 12 in the three dimensional object recognition device 10.

The concept of the three dimensional object recognition device 10 according to the present invention is not limited by the exemplary embodiment. It is possible to have various modifications of the exemplary embodiment. For example, in the three dimensional object recognition device 10 according to the exemplary embodiment, the light shaft judgment section 18 in the control unit 12 detects a three dimensional object generated by the light shaft phenomenon in one of the left hand side image and the right hand side image in which the recognition device 16 recognizes the presence of the three dimensional object. However, the concept of the present invention is not limited by this. It is acceptable for the light shaft judgment section 18 to detect a three dimensional object generated by the light shaft phenomenon on the basis of both the left hand side image and the right hand side image.

It is also acceptable for the light shaft judgment section 18 to determine that the three dimensional object recognized by the recognition device 16 is an incorrect three dimensional object caused by the light shaft phenomenon when the light shaft phenomenon is generated in both the left hand side image and the right hand side image.

This makes it possible to prevent that the light shaft judgment section 18 determines that the recognition process of recognizing the three dimensional object performed by the recognition section 16 is an incorrect recognition when the light shaft phenomenon occurs in one of the left hand side image and the right hand side image. This makes it possible to suppress the incorrect recognition of the recognition section 16, and to enhance the judgment accuracy of the light shaft judgment section 18 to detect the occurrence of the incorrect recognition of the recognition section 16.

When the light shaft judgment section 18 detects the occurrence of the light shaft phenomenon in both the left hand side image and the right hand side image, it is acceptable for the light shaft judgment section 18 to compare a position and length of light shaft in the front images, i.e. the left hand side image and the right hand side image. When the comparison result indicates that the position and length of light shaft in the left hand side image is approximately equal to those in the right hand side image, it is acceptable for the light shaft judgment section 18 to determine that the three dimensional object recognized by the recognition device 16 is an incorrect three dimensional object due to the light shaft phenomenon. This makes it possible to increase the detection accuracy of the light shaft judgment section 18 to detect the light shaft phenomenon in the image data.

The three dimensional object recognition device 10 according to the exemplary embodiment has the control unit 12 which is the microcomputer composed of the CPU 12A, and the memory unit 1213, etc. The CPU 12A executes the programs stored in the memory unit 12B so as to realize each of the functions of the control unit 12 shown in FIG. 2.

However, the concept of the present invention is not limited by this. It is acceptable to use a hardware device composed of one or more integrated circuits (ICs) as a combination of logical circuits and analogue circuits, instead of using the software programs.

The concept of the three dimensional object recognition device 10 is applied to various types of systems to detect a three dimensional object. In order to realize the three dimensional object recognition device 10 according to the present invention, it is also possible to use programs, a method, and a non-transitory computer readable storage medium for storing those programs to execute the functions of the three dimensional object recognition device 10. It is also possible to realize a part of those functions of, or the overall functions of the three dimensional object recognition device 10 by using a method of detecting a three dimensional object.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A three dimensional object recognition device comprising a pair of a left hand side camera and a right hand side camera capable of capturing front images of a same forward view, and a computer system including a central processing unit, the computer system being configured to provide:
   a recognition section capable of receiving front images captured by and transmitted from the left hand side camera and the right hand side camera, and of detecting and recognizing a three dimensional object in the front images on the basis of a parallax generated between the front images; and
   a light shaft judgment section capable of detecting whether light shaft phenomenon has happened in a three dimensional object area in at least one of the front images every time the recognition section recognizes the three dimensional object, and of judging that the three dimensional object recognized by the recognition section is an incorrect three dimensional object when detecting the occurrence of the light shaft phenomenon.

2. The three dimensional object recognition device according to claim 1, wherein the light shaft judgment section comprises:
   a pixel search section capable of extracting a pixel search start point from the three dimensional object area, and of searching pixels in a high brightness direction in the three dimensional object area around the pixel search start point, and which generates a pixel search trace of the searched pixels and
   a candidate selection section capable of selecting the pixel search trace as a candidate of light shaft when a pixel or a pixel area having a predetermined brightness which is not less than a brightness threshold value is detected as a light source on the pixel search trace,
   wherein when the pixel search trace selected by the candidate selection section is approximately on a straight line from the pixel search start point to the position of the detected light source, the candidate selection section detects that the light shaft phenomenon happens in the three dimensional object area.

3. The three dimensional object recognition device according to claim 1, wherein the light shaft judgment section detects whether a light shaft phenomenon happens in the three dimensional object area in one of the images every time the recognition section recognizes the three dimensional object.

4. The three dimensional object recognition device according to claim 1, wherein the light shaft judgment section detects that the three dimensional object recognized by the recognition section is an incorrect three dimensional object when detecting the occurrence of the light shaft phenomenon in one of the front images transmitted from the left hand side camera and the right hand side camera.

* * * * *